United States Patent [19]
Sekine

[11] Patent Number: 5,982,770
[45] Date of Patent: Nov. 9, 1999

[54] CHECK SYSTEM FOR CHECKING INFORMATION INDICATIVE OF CONNECTIONS IN MULTISTAGE SWITCHING NETWORK

[75] Inventor: Yasuharu Sekine, Tokyo, Japan

[73] Assignee: NEC Corporation, Tokyo, Japan

[21] Appl. No.: 08/864,369

[22] Filed: May 28, 1997

[30] Foreign Application Priority Data

May 28, 1996 [JP] Japan ................................ 8-133048

[51] Int. Cl.$^6$ ............................ H04L 12/50; H04Q 11/00
[52] U.S. Cl. ........................ 370/360; 370/380; 370/387; 370/388; 340/826
[58] Field of Search ................................ 370/248, 217, 370/218, 225, 250, 351, 355, 357, 360, 362–365, 380, 381, 384, 386–388; 340/825.29, 825.03, 826, 825.8; 395/200.72, 200.62, 200.68, 200.79

[56] References Cited

U.S. PATENT DOCUMENTS

| | | | |
|---|---|---|---|
| 4,991,168 | 2/1991 | Richards | 370/381 |
| 5,369,400 | 11/1994 | Bowdon | 340/825.8 |
| 5,430,716 | 7/1995 | Pawelski | 370/388 |
| 5,751,764 | 5/1998 | Meyer et al. | 370/380 |
| 5,917,426 | 6/1999 | Yoshifuji | 370/388 |

FOREIGN PATENT DOCUMENTS

| | | |
|---|---|---|
| 49-111530 | 10/1974 | Japan . |
| 61-72455 | 4/1986 | Japan . |
| 5-207527 | 8/1993 | Japan . |

*Primary Examiner*—Douglas W. Olms
*Assistant Examiner*—Seema S. Rao
*Attorney, Agent, or Firm*—Sughrue, Mion, Zinn, Macpeak & Seas, PLLC

[57] ABSTRACT

In a check system for checking information indicative of connections in a multistage switching network comprising S stages of switching groups and a main control section for controlling the switching groups, the multistage switching network has a switching size of M by N (M×N) that is defined by M input lines and N output lines. Each of the switching groups comprises a plurality of switching sections each of which has a plurality of input terminals, a plurality of output terminals, a switching unit for use in connecting these terminals with each other, and a switch control unit for controlling the switching unit. The main control section comprises a memory unit which stores information indicative of connections between the individual switching sections. The main control section has a function of checking whether an output terminal having a specific number of a switching group in a C-th stage (C≦(S−1)) can logically be connected to an input terminal having other specific number of a switching group in a (C+1)-th stage, in which the function checks for each connection path in terms of the information that is stored in the memory unit and is indicative of the connections.

3 Claims, 12 Drawing Sheets

CHECK SYSTEM FOR CHECKING INFORMATION INDICATIVE OF CONNECTIONS IN MULTISTAGE SWITCHING NETWORK

BACKGROUND OF THE INVENTION

The present invention relates to a check system for checking information indicative of connections in a multistage switching network. In particular, the present invention relates to a check system for checking connection logistics between an output terminal of a switching section in one stage and an input terminal of an associated switching section in the next adjacent stage, for all connection paths in a multistage switching network which comprises two or more stages of switching groups each including two or more switching sections.

An example of a multistage switching network is described in conjunction with a three-stage switching network. A switching size is indicated by M by N (M×N) when the three-stage switching network has M input lines and N output lines (where M and N are each a natural number). The three-stage switching network includes the three stages of switching groups. The switching group in the first stage comprises P switching sections (where P is a natural number represented by M/m). Each of the P switching sections has a switching size of m by r (m×r) that is defined by m input lines and r output lines (where m and r are each a natural number, and m≦M). The switching group in the second stage comprises R switching sections each having a switching size of p by q (p×q) that is defined by p input lines and q output lines. Likewise, the switching group in the third stage comprises Q switching sections (where Q is a natural number represented by N/n) having a switching size of r by n (r×n) that is defined by r input lines and n output lines. The three-stage switching network further comprises a main control section. The main control section controls connections between the individual switching sections of the first, the second, and the third switching groups. In addition, the main control section comprises a memory unit for use in storing information indicative of the connections between the individual switching sections of the first, the second, and the third switching groups.

Each switching section in the switching groups comprises a switching unit and a switch control unit. The switching unit has a plurality of input terminals and a plurality of output terminals and is adapted to connect one of the input terminals to one of the output terminals. The switch control unit controls the switching unit.

The following problems arise in such a multistage switching network if no checking is made about whether the information indicative of the connections between the switching sections stored in the memory unit is logically correct.

The main control section of the conventional multistage switching networks searches an available path for the connection according to the information indicative of the connections that is stored in the memory unit. Such operation is made even though a portion of the information is incorrect, when the main control section receives a request for establishing a connection between the input and the output terminals in the multistage stage switching network. The output terminal already occupied may be allocated to other path. This means the path which is already established for the individual switching sections may be disconnected when there is a request for establishing a connection between the input and the output terminals in the multistage switching network with a portion of the information indicative of the connections being damaged in the memory unit.

In addition, the conventional multistage switching networks may download a command for connection into the individual switching sections that is different from the actual status of connection between the switching sections established according to the incorrect information stored in the memory unit. This may result in establishment of a path that is different from the one already established.

The main control section is connected to the individual switch control units in the switching sections via control signal lines. The control signal lines may be disconnected or the switch control unit in the switching sections may be reset. If such disconnection or reset happens, the information indicative of the connections in the memory unit is downloaded into the individual switching sections after recovery of the connection. The downloading is made in order to match the connection status with the connection indicated by the information in the memory unit of the main control section. The path that is already established between the individual switching sections may be disconnected when the downloading is made with a portion of or entire the information indicative of the connections is damaged in the memory unit.

Therefore, an object of the present invention is to provide a check system for checking information indicative of connections in a multistage switching network, in which the checking system is capable of checking whether the information is damaged that is stored in a memory unit and is indicative of connections in the multistage switching network to avoid accidental disconnection of the path that is already established between individual switching sections due to incorrect information about the connections.

SUMMARY OF THE INVENTION

A multistage switching network according to the present invention comprises S stages (where S is a natural number) of switching groups and a main control section for controlling the switching groups. The multistage switching network has a switching size of M by N (M×N) that is defined by M input lines and N output lines (where M and N are each a natural number). Each switching group comprises two or more switching sections each having a plurality of input terminals, a plurality of output terminals, a switching unit for use in connecting these terminals, and a switch control unit for controlling the switching unit. The individual switching groups are cross-connected to each other according to a predetermined specification. More specifically, output terminals 1 through P (where P is a natural number) of a K-th switching section (where K is a natural number) in one switching group are cross-connected to a K-th input terminals of 1 through P switching sections in the switching group in the next adjacent stage. The main control section comprises a memory unit which stores information indicative of connections between the individual switching sections. In response to a request for establishing a path to connect the input terminal of the number a to an output terminal of the number b in the multistage switching network (a≦M, b≦N), the main control section searches the availability of the input and the output terminals of each switching section according to the information that is stored in the memory unit and is indicative of the connections. The main control section then searches an available path for a connection in the multistage switching network. It also sends a command for connection to the switch control units in the individual switching sections according to a result of the seeking, as well as receives a result of the establishment of the connection path from the switch control units in the individual switching sections. The main control section also updates the information that is stored in the memory unit and is indicative of the connections according to the result of the establishment of the connection.

According to an aspect of the present invention, the main control section has first means having a function of checking whether an output terminal having a specific number of the switching group in the c-th stage ($c \leq (S-1)$) can logically be connected to an input terminal having the other specific number of the switching group in the (c+1)-th stage, in which the first means makes checking for each connection path in terms of the information that is stored in the memory unit and is indicative of the connections.

DESCRIPTION OF THE PREFERRED EMBODIMENTS

Figure 1:
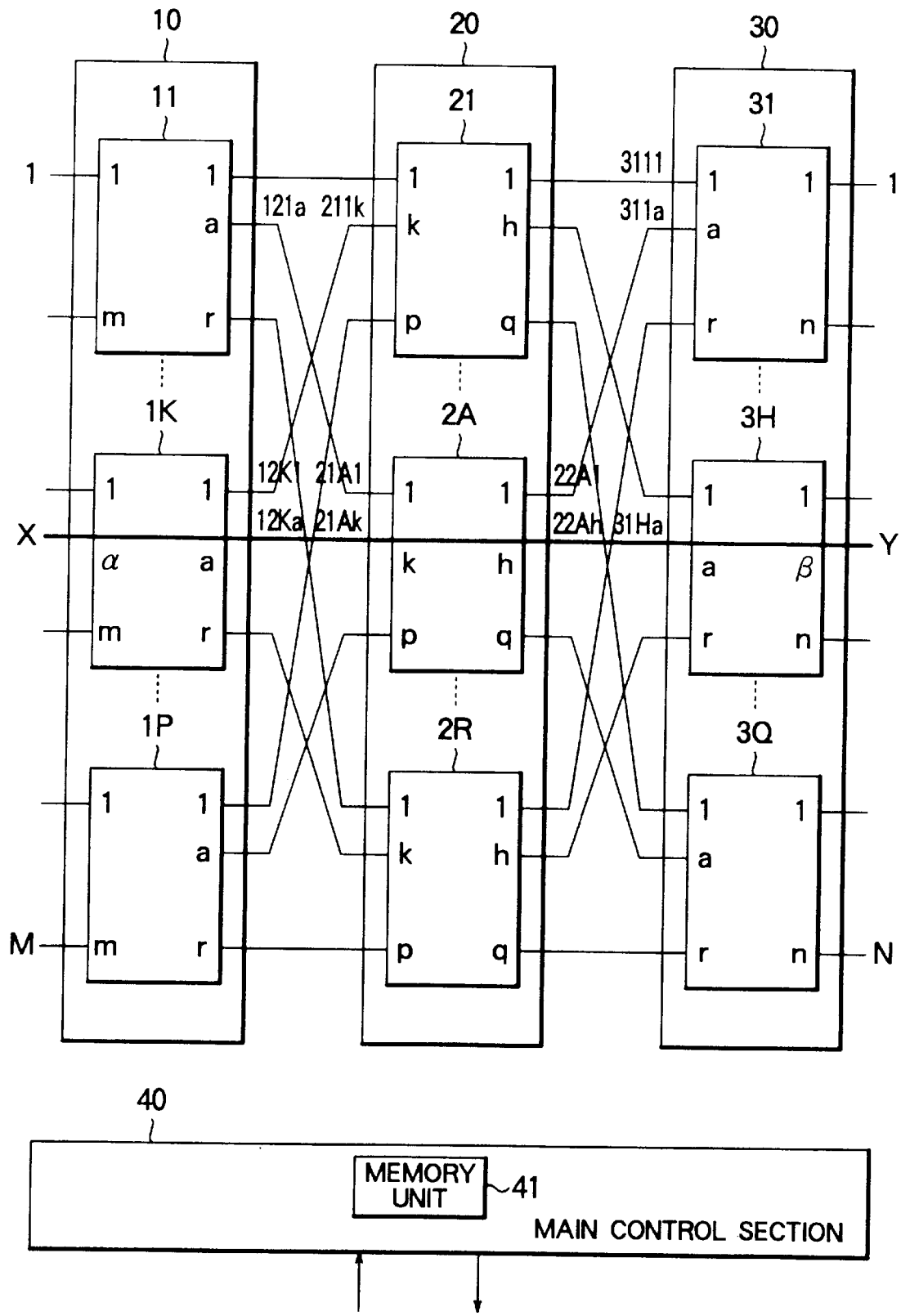
FIG. 1 is a view illustrating an exemplary structure of a conventional multistage switching network.
Figure 2:
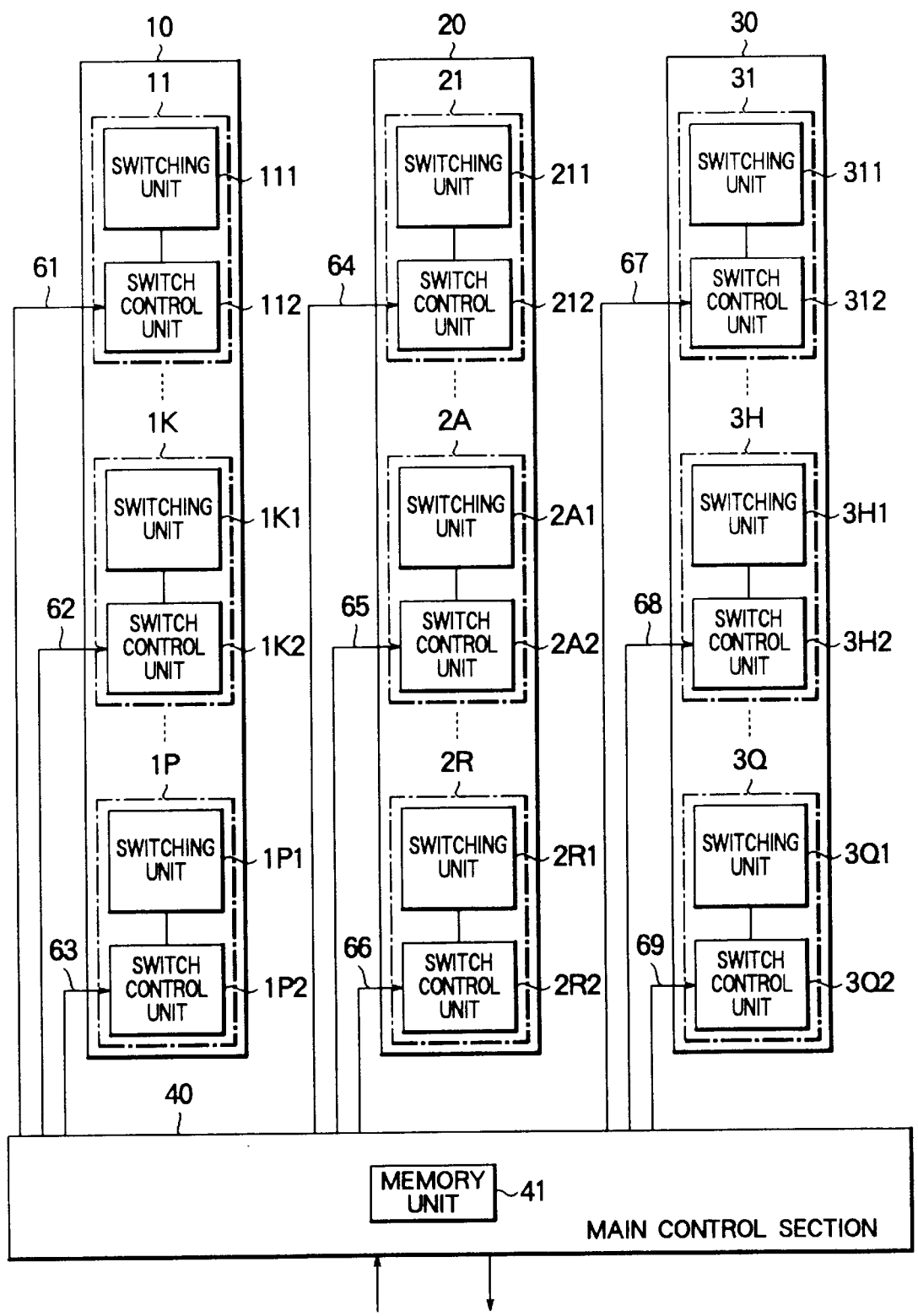
FIG. 2 is a view for use in describing connections of control signal lines in the multistage switching network shown in FIG. 1.
Figure 3:
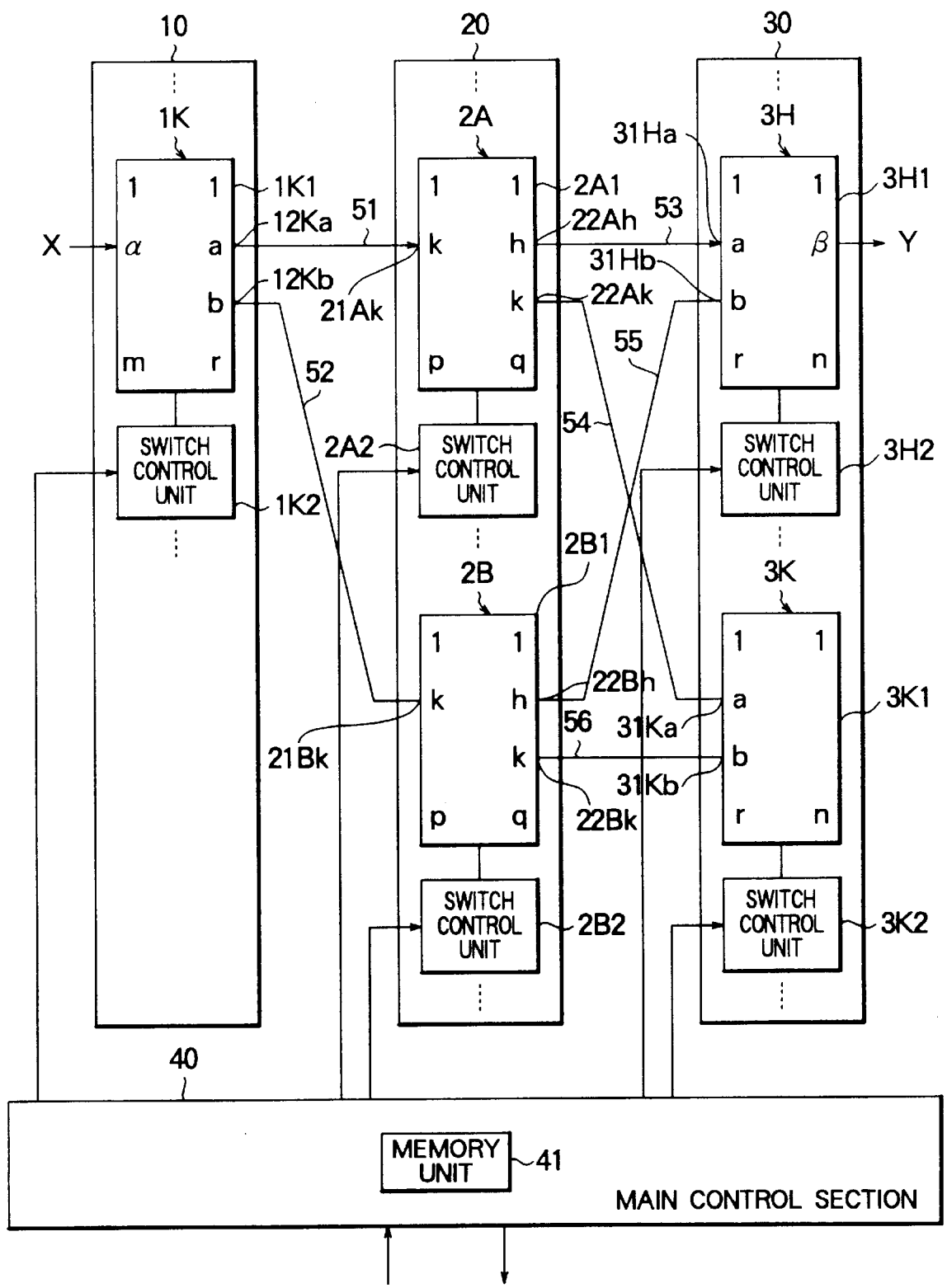
FIG. 3 is a view for use in describing connections between individual switching groups in two or more stages in the multistage switching network shown in FIG. 1.

Referring to FIGS. 1 through 3, a conventional multistage switching network is described for the purpose of facilitating the understanding of the present invention. The exemplary multistage switching network herein described has a three-stage structure with a switching size of M by N (M×N) that is defined by M input lines and N output lines (where M and N are each a natural number).

In FIG. 1, the three-stage switching network comprises a switching group 10 in the first stage, a switching group 20 in the second stage, a switching group 30 in the third stage, and a main control section 40. The switching group 10 in the first stage has P switching sections 11 through 1P (where P is a natural number represented by M/m). Each of the switching sections 11 through 1P has a switching size of m by r (m×r) that is defined by m input lines and r output lines (where n and r are each a natural number and $m \leq M$). The switching group 20 in the second stage has R switching sections 21 through 2R (where R is a natural number). Each of the switching sections 21 through 2R is that is defined by p input lines and q output lines (where p and q are each a natural number). Likewise, third switching group 30 in the third stage has Q switching sections 31 through 3Q (where Q is a natural number represented by N/n). Each of the switching sections 31 through 3Q is that is defined by r input lines and n output lines (where n is a natural number). The main control section 40 controls connections between the switching groups 10, 20, and 30 in the first, second, and third stages, respectively, through control signal lines described below. The main control section 40 comprises a memory unit 41 for use in storing information indicative of connections between the individual switching sections.

As described below, each of the switching sections included in the switching groups has a switching unit and a switch control unit. The switching unit has a plurality of input terminals and a plurality of output terminals and is adapted to connect one of the input terminals to one of the output terminals. The switch control unit controls the switching unit.

Referring to FIG. 2, a K-th switching section 1K (where K is a natural number) included in the switching group 10 in the first stage comprises a switching unit 1K1 and a switch control unit 1K2. An A-th switching section 2A (where A is a natural number) included in the switching group 20 in the second stage comprises a switching unit 2A1 and a switch control unit 2A2. Likewise, an H-th switching section 39 (where H is a natural number) included in the switching group 30 in the third stage comprises a switching unit 3H1 and a switch control unit 3R2.

A switch control unit 112 in the first switching section 11 included in the switching group 10 in the first stage is connected to the main control section 40 via a control signal line 61. Likewise, switch control units 1K2, 1P2, 212, 2A2, 2R2, 312, 3H2, and 3Q2 are connected to the main control section 40 via control signal lines 62, 63, 64, 65, 66, 67, 68, and 69, respectively.

Referring to FIG. 3, connections between the input and the output terminals of the switching sections are described. Considering the switching groups 10 and 20 in the first and the second stages, respectively, an a-th output terminal 12Ka (where $1 \leq a \leq r$) of the K-th switching section 1K (where $1 \leq K \leq P$) is connected to a k-th input terminal 21Ak (where $1 \leq k \leq p$) of the A-th switching section 2A (where $1 \leq A \leq R$) via a signal line 51. A b-th output terminal 12Kb (where $1 \leq b \leq r$) of the K-th switching section 1K is connected to a k-th input terminal 21Bk of the B-th switching section 2B (where $1 \leq B \leq R$) via a signal line 52 Considering the switching groups 20 and 30 in the second and the third stages, respectively, an h-th output terminal 22Ah (where $1 \leq h \leq q$) of the A-th switching section 2A is connected to an a-th input terminal 31Ha of the H-th switching section 39 (where $1 \leq H \leq Q$) via a signal line 53. A k-th output terminal 22Ak of the A-th switching section 2A is connected to an a-th input terminal 31Ka of the K-th switching section 3K (where $1 \leq K \leq Q$) via a signal line 54. An h-th output terminal 22Bh of the B-th switching section 2B is connected to a b-th input terminal 31Hb of the B-th switching section 3H via a signal line 55. A k-th output terminal 22Bk of the B-th switching section 2B is connected to a b-th input terminal 31Kb of the K-th switching section 3K via a signal line 56.

Figure 11:
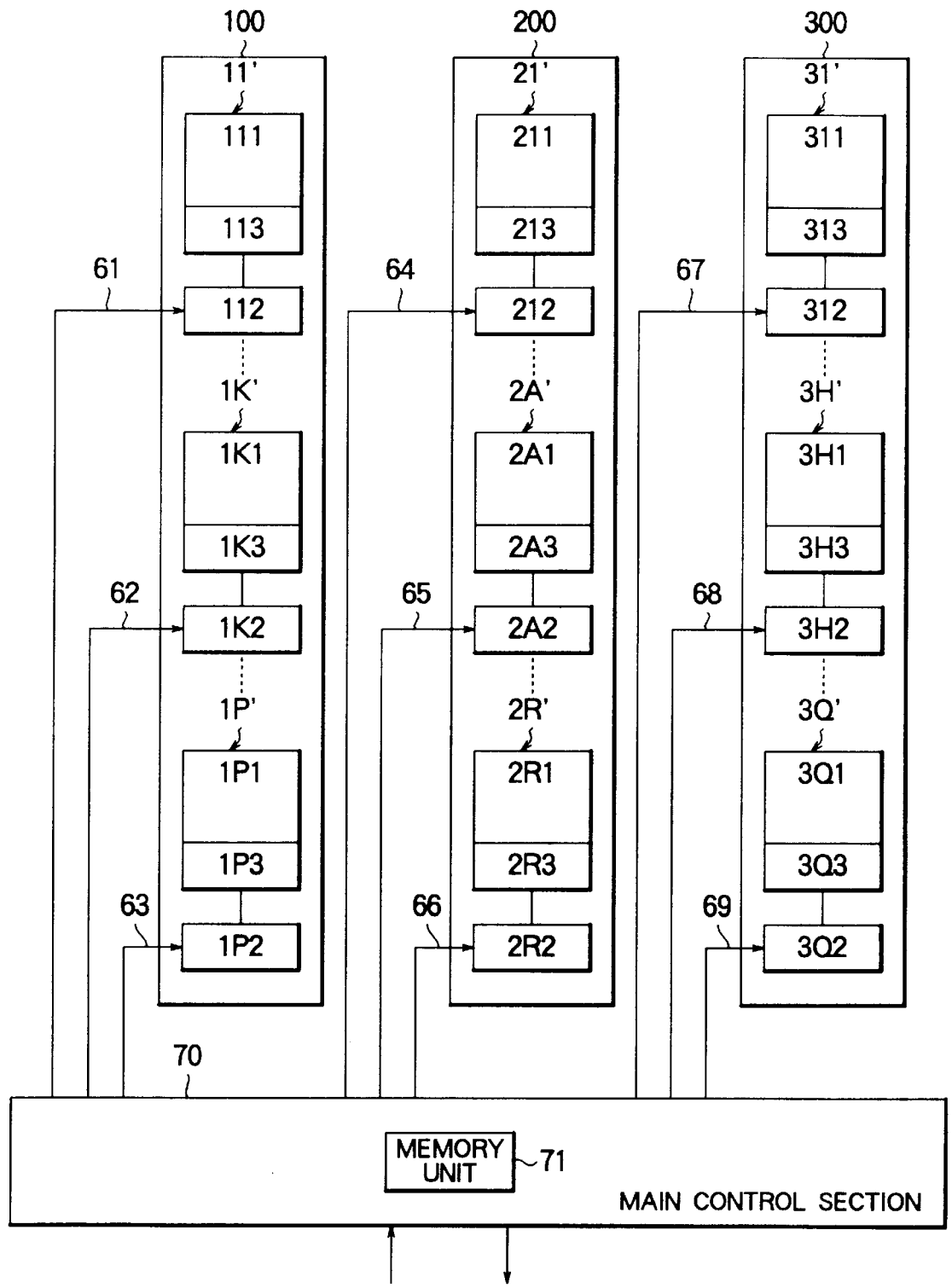
FIG. 11 is a view for use in describing connections of control signal lines in the multistage switching network shown in FIG. 10.

In FIG. 11 output terminals 1 through r of the first switching section 11 in the switching group 10 in the first stage are connected to first input terminals of the first through R-th switching sections 21 through 2R, respectively, of the switching group 20 in the second stage. Likewise, output terminals 1 through q of the first switching section 21 in the second switching group 20 in the second switching group are connected to first input terminals of the first through Q-th switching sections 31 through 3Q, respectively, of the switching group 30 in the third stage in this way, the output terminals of the switching sections in the switching group in one stage are cross-connected to the input terminals of the switching sections in the switching group in the next adjacent stage.

The connections between the switching sections in the three-stage switching network having the above-mentioned structure are described in conjunction with FIG. 3. In the three-stage switching network, it is assumed that a request is issued to connect an input terminal x (where $x \leq M$) to an output terminal Y (where $Y \leq N$). In such a case, the main control section 40 determines that the input terminal X corresponds to an input terminal α of the K-th switching section 1K in the switching group 10 in the first stage. The main control section 40 also determines that the output terminal Y corresponds to an output terminal β of the H-th switching section 3H in the switching group 30 in the third stage. Next, the main control section 40 searches the availability of the output terminal β of the H-th switching section 3H according to the information stored in the memory unit 41. The main control section 40 then carries out one of the following operation depending on the availability of the output terminal β.

(1) When the output terminal β of the E-th switching section 3H is occupied, the main control section 40 searches an input terminal that is connected to the output terminal β (or Y) of the three-stage switching network. If the input terminal X is found as a result of the seeking, the main control section 40 determines "already connected" because the path that is designated by the connection request is already occupied. If the input terminal found as a result of the seeking is the one other than the input terminal X, the main control section 40 determines "connection disabled".

(2) When the output terminal β of the H-th switching section 3H is not occupied, the main control section 40 searches, one by one from the first, the availability of the output terminals 1 through r of the K-th switching section 1K in the switching group 10 in the first stage according to the information stored in the memory unit 41. For example, it is assumed that first through (a–1)-th output terminals 1 through (a–1) of the K-th switching section 1K are occupied and the a-th output terminal 12Ka is not occupied. In such a case, the main control section 40 searches the availability of the output terminal 22Ah of the A-th switching section 2A that is connected to the B-th switching section 3H in which the output terminal β is included. When the output terminal 22Ah is not occupied, the main control section 40 connects the input terminal a of the K-th switching section 1K in the switching group in the first stage to the output terminal 12Ka. The main control section 40 connects the input terminal 21Ak to the output terminal 22Ah of the A-th switching section 2A in the switching group 20 in the second stage. The main control section 40 further connects the input terminal 31Ha to the output terminal β of the E-th switching section 3H in the switching group 30 in the third stage.

A path is thus established between the input terminal X and the output terminal Y of the three-stage switching network. The main control section 40 transmits a command to the switch control units in the individual switching sections for connecting the input terminal and the output terminal obtained in the manner described above. In response to the commands for the connection, each switching section establishes the path that is designated by the request. Each switching section supplies to the main control section 40 a signal indicating successful connection when the input and the output terminals are connected to each other without any trouble- The main control section 40 stores the information indicative of the connections that is set in the memory unit 41 when the establishment of the path is completed correctly.

When the output terminal 22Ah of the A-th switching section 2A is occupied, the main control section 40 searches the availability of the b-th output terminal 12Kb (where a<b) of the K-th switching section 1K. When the b-th output terminal 12Kb is not occupied, the main control section 40 searches the availability of the h-th output terminal 22Bh of the B-th switching section 2B that is connected to the H-th switching section 3H. In this manner, the main control section 40 repeats the above-mentioned operations until it finds available output terminals of the switching sections in the switching groups 10 and 20 in the first and second stages.

The following problems arise in such a multistage switching network if no checking is made about whether the information indicative of the connections between the switching sections stored in the memory unit is logically correct.

The main control section 40 of the conventional multistage switching networks searches an available path for the connection according to the information indicative of the connections that is stored in the memory unit 41. Such operation is made even though a portion of the information is incorrect, when the main control section 40 receives a request for establishing a connection between input and output terminals in the multistage switching network. The output terminal already occupied may be allocated to other path. This means the path which is already established for the individual switching sections may be disconnected when there is a request for establishing a connection between the input and the output terminals in the multistage switching network with a portion of the information indicative of the connections being damaged in the memory unit 41.

In addition, the conventional multistage switching networks may download a command for connection into the individual switching sections that is different from the actual status of connection between the switching sections established according to the incorrect information stored in the memory unit 41. This may result in establishment of a path that is different from the one already established.

The main control section 40 is connected to the individual switch control units in the switching sections via control signal lines. The control signal lines may be disconnected or the switch control unit in the switching sections may be reset. If such disconnection or reset happens, the information indicative of the connections in the memory unit 41 is downloaded into the individual switching sections after recovery of the connection. The downloading is made in order to match the connection status with the connection indicated by the information in the memory unit 41 of the main control section 40. The path that is already established between the individual switching sections may be disconnected when the downloading is made with a portion of or entire the information indicative of the connections is damaged in the memory unit 41.

Figure 4:
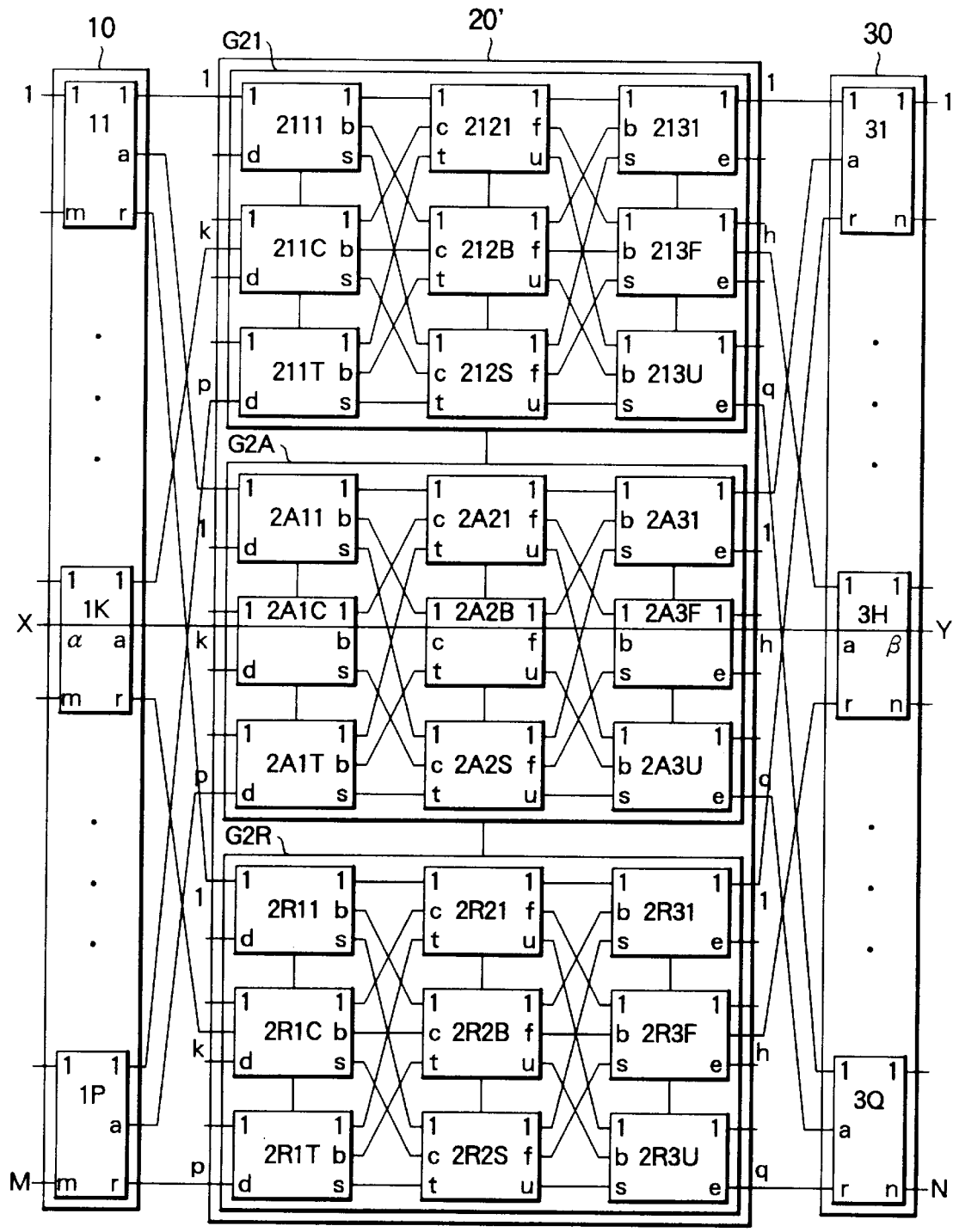
FIG. 4 is a view illustrating a structure of a multistage switching network according to a first embodiment of the present invention.
Figure 5:
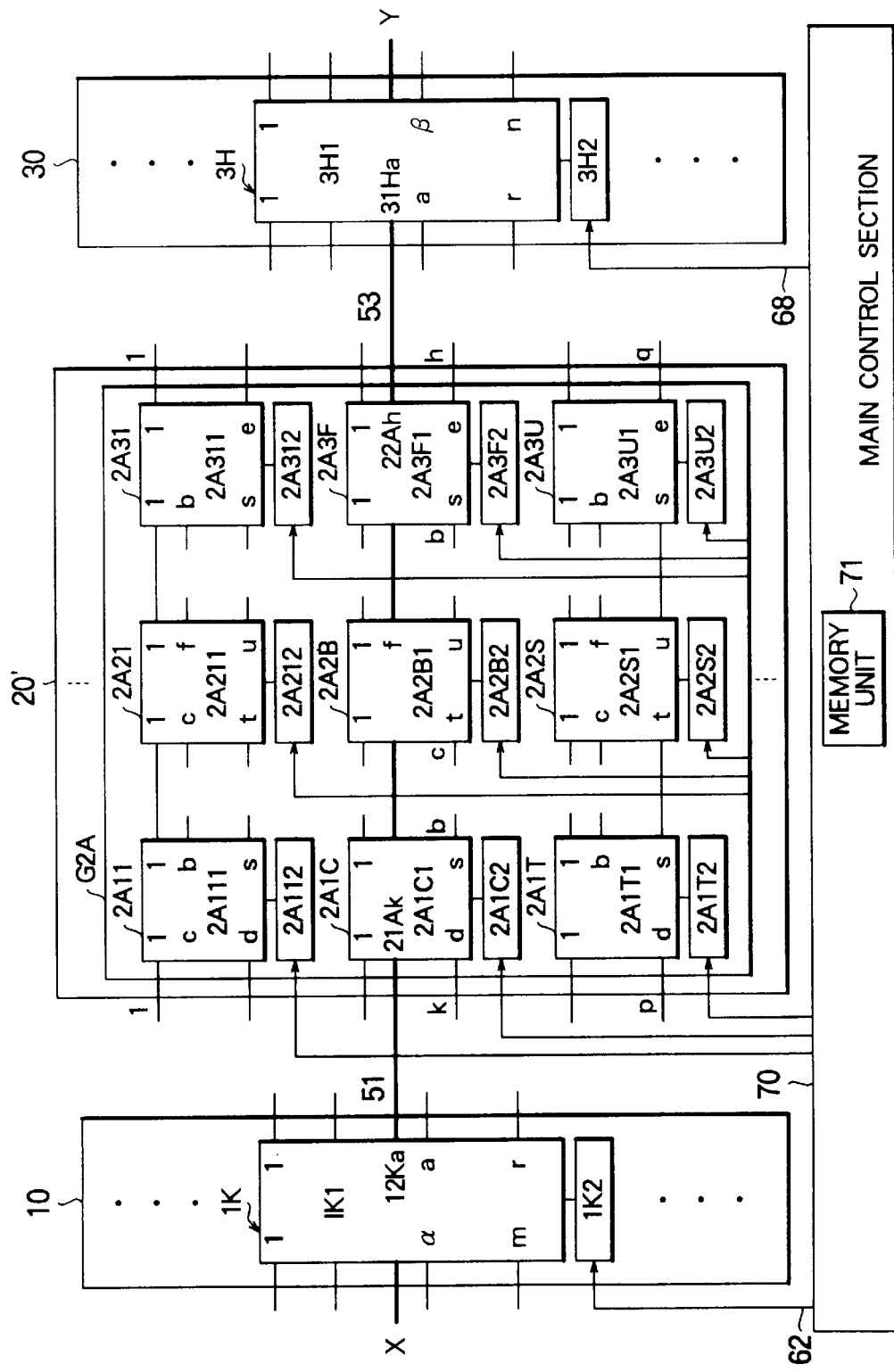
FIG. 5 is a view for use in describing a structure of a switching section in a stages of switching groups in the multistage switching network shown in FIG. 4.
Figure 6:
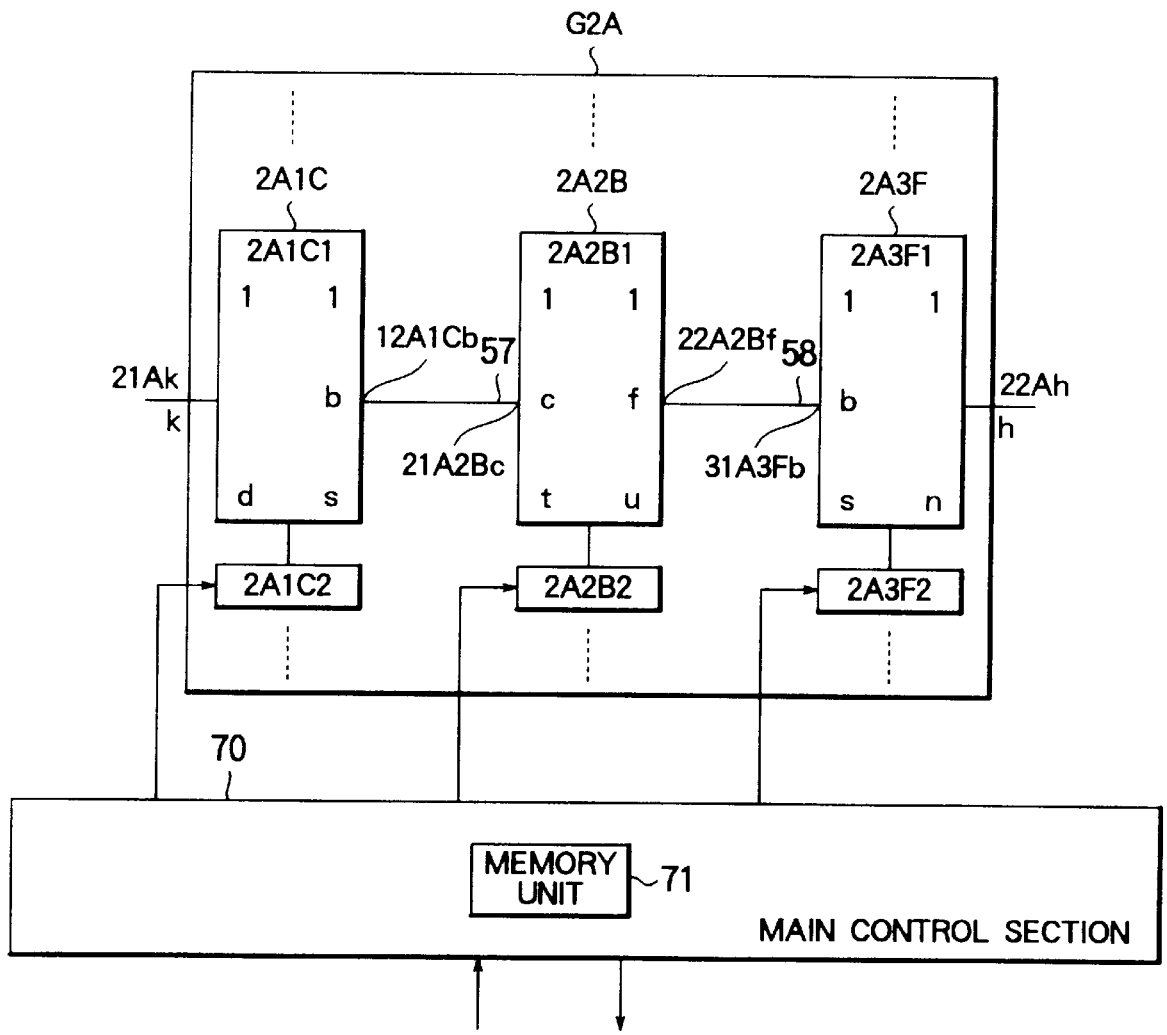
FIG. 6 is a view for use in describing connections between the individual switching sections in the stages of switching groups in the multistage switching network shown in FIG. 4.

Referring to FIGS. 4 through 6, a multistage switching network according to a first embodiment of the present invention is described. In this embodiment, the multistage switching network has a switching size of M by N that is defined by M input lines and N output lines.

In FIG. 4, the exemplary multistage switching network herein described has a five-stage structure comprising a switching group 10 In the first stage, a switching group 20' in the second stage, and a switching group 30 in the third stage. The switching group 10 in the first stage has P switching sections having a switching size of m by r (m×r) that is defined by m input lines and r output lines. The switching group 20' in the second stage has R switching sections with p input lines and q output lines. Likewise, the switching group 30 in the third stage has Q switching sections that is defined by r input lines and n output lines.

As shown in FIG. 5, the multistage switching network further comprises a main control section 70. The main control section 70 controls establishment of paths between the switching groups 10, 20, and 30 in the first, second, and third stages, respectively. The main control section 70 comprises a memory unit 71 for use in storing information indicative of connections between the individual switching sections.

Switching section groups G21 through G2R included in the switching group 20' in the second stage each has a three stage switching structure. The first stage of each switching section group comprises T switching sections (where T is a natural number represented by d by p). Each of the T switching sections has a switching size of d by s that is defined by d input lines and s output lines (where d and s are each a natural number and d≦p). The second stage comprises S switching sections. Each of the s switching section has a switching size of t by u that is defined by t input lines and u output lines (where t and u are each a natural number). The third stage comprises U switching sections (where U is a natural number represented by e by q). Each of the U switching sections has a switching size of s by e defined by s input lines and e output lines (where e is a natural number and e≦Q).

As described above, the multistage switching network having the switching size of M by N according to the present invention has a five-stage structure.

In FIG. 5, the K-th switching section 1K included in the switching group 10 in the first stage comprises a switching unit 1K1 and a switch control unit 1K2. The H-th switching section 3H included in the switching group 30 in the third stage comprises a switching unit 3H1 and a switch control unit 3H2. For the switching group 20' in the second stage, a switching section group G2A (1≦A≦R) comprises switching sections 2A11, 2A1C, and 2A1 in the first stage, switching sections 2A21, 2A2B, and 2A2S in the second stage, and switching sections 2A31, 2A3F, and 2A3U in the third stage. Each of the switching sections 2A11, 2A1C, and 2A1T has switching units 2A111, 2A1C1, and 2A1T1, and switch control units 2A112, 2A1C2, and 2A1T2. Likewise, each of the switching sections 2A21, 2A2B, and 2A2S has switching units 2A211, 2A2B1, and 2A2S1, and switch control units 2A212, 2A2B2, and 2A2S2. Each of the switching sections 2A31, 2A3f, and 2A3U has switching units 2A311, 2A3F1, and 2A3U1, and switch control units 2A312, 2A3F2, and 2A3U2.

The switch control unit 1K2 in the X-th switching section 1K is connected to the main control section 70 via a control signal line 62. Likewise, the switching sections in the remaining switching sections are also connected to the main control section 70 via control signal lines, as indicated in the drawings.

Next, connections between the input and the output terminals of the individual switching sections are described with reference to FIGS. 5. An a-th output terminal 12Ka of the K-th switching section 1K is connected to a k-th input terminal 21Ak (where 1≦k≦p) of the A-th switching section group G2A via a signal line 51. An h-th output terminal 22Ah (where 1≦h≦q) of the A-th switching section group G2A is connected to an a-th input terminal 31Ha (where 1≦H≦Q) of the a-th switching section 39 (where 123 H≦Q) in the switching group 30 in the third stage via a signal line 53.

In FIG. 4, the output terminals 1 through r of the first switching section 11 In the switching group 10 in the first stage are connected to the first input terminals of the first through the R-th switching section groups G21 through G2R, respectively, in the switching group 20' in the second stage. The output terminals 1 through q of the first switching section group G2 in the switching groups 20' in the second stage are connected to the first input terminals of the first through the Q-th switching sections 31 through 3Q in the switching group 30 in the third stage. In this way, the output terminals of the individual switching sections are cross-connected to the input terminals of the switching sections in the next adjacent stage.

Referring to FIG. 6, connections between the switching section groups in the switching group 20' in the second stage are described. For the A-th switching section group G2A in the switching group 20' in the second stage, a b-th output terminal 12A1Cb (where 1≦b≦s) of the C-th switching section 2A1C (where 1≦c≦T) in the first stage is connected to a c-th input terminal 21A2Bc (where 1≦c≦t) of the B-th switching section 2A2B (where 1≦B≦S) in the second stage via a signal line 57. An f-th output terminal 22A2Bf (where 1≦f≦u) of the B-th switching section 2A2B is connected to a b-th input terminal 31A3Fb of the F-th switching section 2A3F (where 1≦F≦U) in the third stage via a signal line 58.

In the first switching section group G21 in the switching group 20' in the second stage in FIG. 4, the output terminals 1 through s of the first switching section 2111 in the first stage are connected to the first input terminals of the first through S-th switching sections 2121 through 212S, respectively, in the second stage. Likewise, the output terminals 1 through u of the first switching section 2121 in the second stage are connected to the first input terminals of the switching sections 2131 through 213U, respectively, in the third stage in this way, the output terminals of the switching sections are also cross-connected to the input terminals of the switching sections in the next adjacent stage, in the switching network having the three-stage structure in the switching section groups of the switching group 20' in the second stage.

Next, a checking system for checking the information indicative of the connections according to the present invention is described. For the description purpose, it is assumed that a request is issued to connect an input terminal X (where X≦M) to an output terminal Y (where Y≦N) of the multistage switching network. It is also described how to establish paths for the connections. in response to the request for connection, the main control section 70 determines that the input terminal X corresponds to an input terminal α of the K-th switching section 1K in the switching group 10 in the first stage. The main control section 70 also determines that the output terminal Y corresponds to an output terminal β of the H-th switching section 3H in the switching group 30 in the third stage. Next, the main control section 70 searches the availability of the output terminal β of the B-th switching section 3H according to the information stored in the memory unit 71. The main control section 70 then carries out one of the following operation depending on the availability of the output terminal β.

(1) When the output terminal β of the E-th switching section 3H is occupied, the main control section 70 searches an input terminal that is connected to the output terminal β (or Y) of the multistage. switching network. If the input terminal X is found as a result of the seeking, the main control section 70 determines "already connected" because the path that is designated by the connection request is already occupied. If the input terminal found as a result of the seeking is the one other than the input terminal X, the main control section 70 determines "connection disabled".

(2) when the output terminal β of the B-th switching section 3H is not occupied, the main control section 70 searches, one by one from the first, the availability of the output terminals 1 through r of the K-th switching section 1K in the switching group 10 in the first stage according to the information stored in the memory unit 71. For example, it is assumed that first through (a–1)-th output terminals 1 through (a–1) of the X-th switching section 1K are occupied and the a-th output terminal 12Ka is not occupied. In such a case, the main control section 70 searches the availability of the h-th output terminal 22Ah of the switching section group G2Ah in the switching group 20' in the second stage, that is connected to the H-th switching section 3H in the switching group 30 in the third stage, in which the output terminal β is included.

When the h-th output terminal 22Ah is occupied, the main control section 70 searches the availability of the b-th output terminal 12Kb (where a<b) of the K-th switching section 1K. When the b-th output terminal 12Kb is not occupied, the main control section 70 searches the availability of the h-th output terminal 22Bh (not shown) of the switching section group G2B (not shown), that is connected to the H-th switching section 3H. In this manner, the main control section 70 repeats the above-mentioned operations until it finds available output terminals of the switching sections in the switching groups 10 and 20' in the first and second stages.

When the h-th output terminal 2Ah is not occupied, the main control section 70 searches an available path in the switching section group G2A.

In FIG. 6, the main control section 70 searches, one by one from the first, the availability of the output terminals 1 through s of the C-th switching section group 2A1C in the first stage in the switching section group G2A in which the k-th input terminal 21Ak is contained.

For example, it is assumed that the first through (b–1)-th output terminals of the C-th switching section 2A1C are occupied and the b-th output terminal 12A1Cb thereof is not occupied. In such a case, the main control section 70 determines whether the f-th output terminal 22A2Bf is occupied of the B-th switching section 2A2B in the second stage, that is connected to the F-th switching section 2A3F in the third stage in which the h-th output terminal 22Ah is included.

When the f-th output terminal 22A2Bf is occupied, the main control section 70 searches the availability of the (b+1)-th output terminal 12A1C(b+1) of the C-th switching section 2A1C in the first stage. If the main control section 70 finds out that the (b+1)-th output terminal is not occupied, it searches the availability of the f-th output terminal 2A2(B+1)f (not shown) of the switching section 2A2(B+1) (not shown) in the second stage, that is connected to the F-th switching section 2A3F in the third stage in which the output terminal 22Ah is included. The main control section 70 repeats the above-mentioned operations until it finds available output terminals of the switching sections in the switching sections in the first and the second stages.

When the f-th output terminal 22A2Bf is not occupied, the main control section 70 establishes a path in the following order: the input terminal 11Kα of the K-th switching section 1K in the switching group 10 in the first stage; the output terminal 12Ka; the k-th input terminal 21Ak in the C-th switching section 2A1C in the first stage of the A-th switching section group G2A in the switching group 20' in the second stage; the b-th output terminal 12A1cb; the c-th input terminal 21A2Bc of the B-th switching section 2A2B in the second stage; the output terminal 22A2Bf; the b-th input terminal 31A3Fb in the F-th switching section 2A3F In the third stage; the output terminal 22Ah; the a-th input terminal 31Ha of the H-th switching 3H in the switching group 30 in the third stage; and the output terminal 32Hβ.

A path is thus established between the input terminal X and the output terminal Y of the multistage switching network. The main control section 70 then transmits a commmand to the switch control units in the individual switching sections for connecting the input terminal and the output terminal obtained in the manner described above. In response to the commands for the connection, each switching section establishes the path that is designated by the request. Each switching section supplies to the main control section 70 a signal indicating "complete" when the input and output terminals are connected to each other without any trouble. The main control section 70 stores the information indicative of the connections that is set in the memory unit 71 when the establishment of the path is completed correctly.

As mentioned above, the main control section 70 is connected to the individual switch control unite in the switching sections via a control signal line. The control signal lines may be disconnected or the switch control unit in the switching sections may be reset. If such disconnection or reset happens, the information indicative of the connections in the memory unit 71 is downloaded into the individual switching sections after recovery of the connection. The downloading is made in order to match the connection status with the connection indicated by the information in the memory unit 71 of the main control section 70. The path that is already established between the individual switching sections may be disconnected when the downloading is made with a portion of or entire the information indicative of the connections is damaged in the memory unit 71.

In the present invention, the main control section 70 reads, for the respective paths, the numbers of the input and the output terminals for each switching section that are stored in the memory unit 71 before the transmission of the connection command to the individual switching sections and initiation of the downloading of the information indicative of the connections into the switching section s. The main control section 70 then checks whether the output terminal having the number read from the memory unit 71 in the switching section in one stage can be connected logically to the input terminal having the number read from the memory unit 71 in the switching section in the next adjacent stage. In addition, the main control section 70 also checks ranges of the number of the input and output terminals.

An example is described where a path is established between the aforementioned input terminal X and the output terminal Y in FIGS. 4 through 6 The main control section 70 first checks whether the input terminal X corresponds to the input terminal a of the K-th switching section 1K. This is determined according to whether the following equation is met:

$$X=(K-1)\times m+\alpha.$$

Likewise, the main control section 70 checks whether the output terminal Y corresponds to the output terminal β of the H-th switching section 3H. This is determined according to whether the following equation is $$Y=(H-1)\times n+\beta.$$

The main control section 70 checks whether the output terminal a of the K-th switching section 1K and the input terminal k of the switching section group G2A are within predetermined ranges ($1 \leq a \leq r$) and ($1 \leq k \leq p$), respectively.

Furthermore, the main control section 70 makes sure that the a-th output terminal 12Ka of the K-th switching section 1K is the terminal that is normally connected to the k-th input terminal 21Ak of the switching section 2A1C via the signal line 51. The main control section 70 also makes sure that the output terminal h of the switching section group G2A and the a-th input terminal a of the H-th switching section 3H are within ranges of ($1 \leq h \leq q$) and ($1 \leq a \leq r$), respectively. Furthermore, the main control section 70 makes sure that the h-th output terminal 22Ah of the switching section group G2A is the terminal that is normally connected to the a-th input terminal 31Ha of the H-th switching section 3H via the signal line 53.

The main control section 70 checks the information indicative of the connections in the switching section group G2A in the following manner. In FIG. 6, the main control section 70 makes sure that the b-th output terminal b of the C-th switching section 2A1C in the first stage and the c-th input terminal c of the B-th switching section 2A2B in the second stage are within predetermined ranges of ($1 \leq b \leq s$) and ($1 \leq c \leq t$), respectively.

The main control section 70 also makes sure that the b-th output terminal 12A1Cb of the C-th switching section 2A1C is the terminal that is normally connected to the c-th input terminal 21A2Bc of the B-th switching section 2A2B via the signal line 57. The main control section 70 then makes sure that the f-th output terminal f of the B-th switching section 2A2B and the b-th input terminal b of the F-th switching section 2A3F are within predetermined ranges of ($1 \leq f \leq u$) and ($1 \leq b \leq s$) respectively.

Furthermore, the main control section 70 makes sure that the f-th output terminal 22A2Bf of the B-th switching section 2A2B is the terminal that is normally connected to the b-th input terminal 31A3Fb of the F-th switching section 2A3F via the signal line 58.

Figure 7:
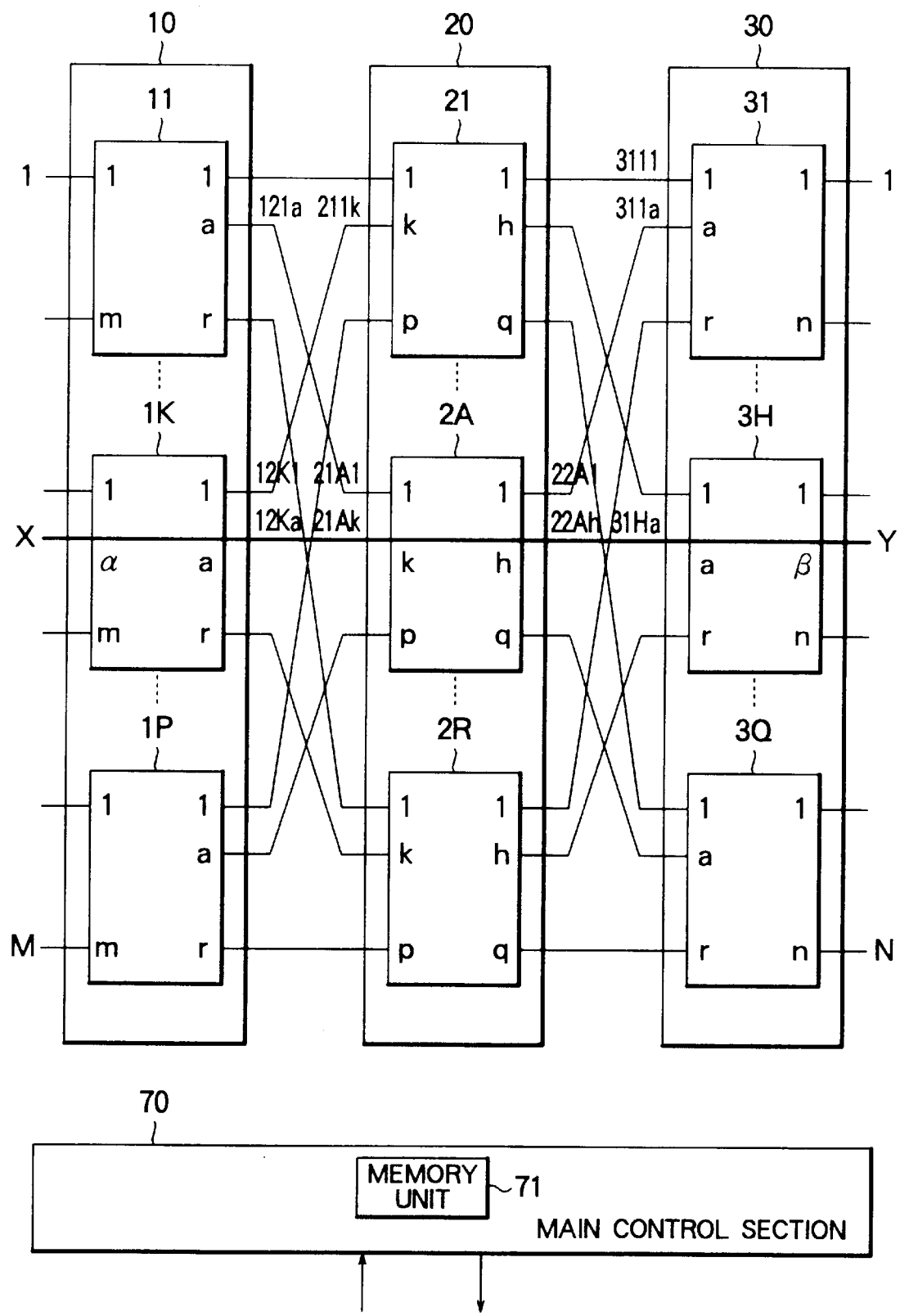
FIG. 7 is a view for use in describing a check system for checking information indicative of connections, according to the present invention.
Figure 8:
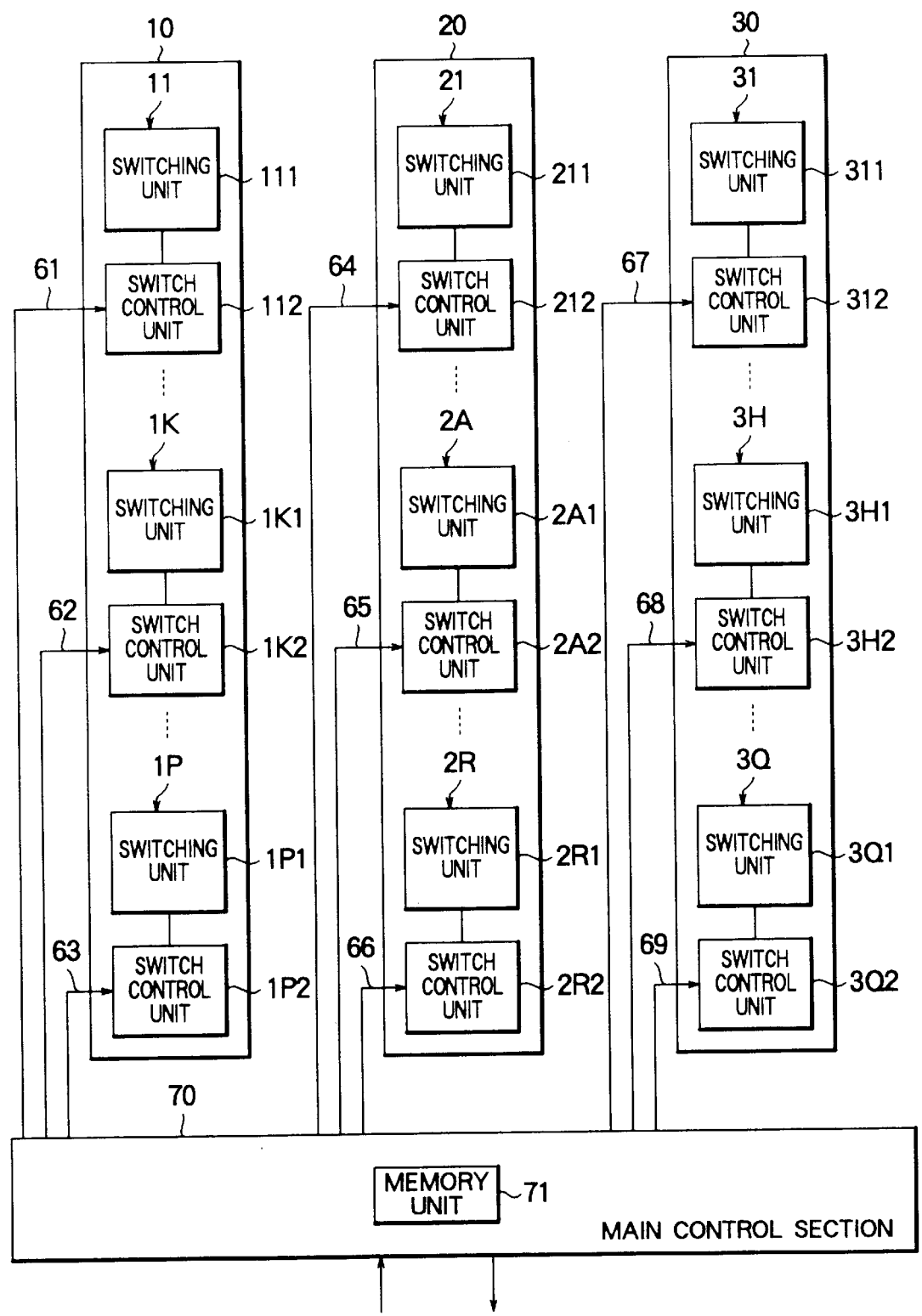
FIG. 8 is a view for use in describing connections of control signal lines in the multistage switching network shown in FIG. 7.
Figure 9:
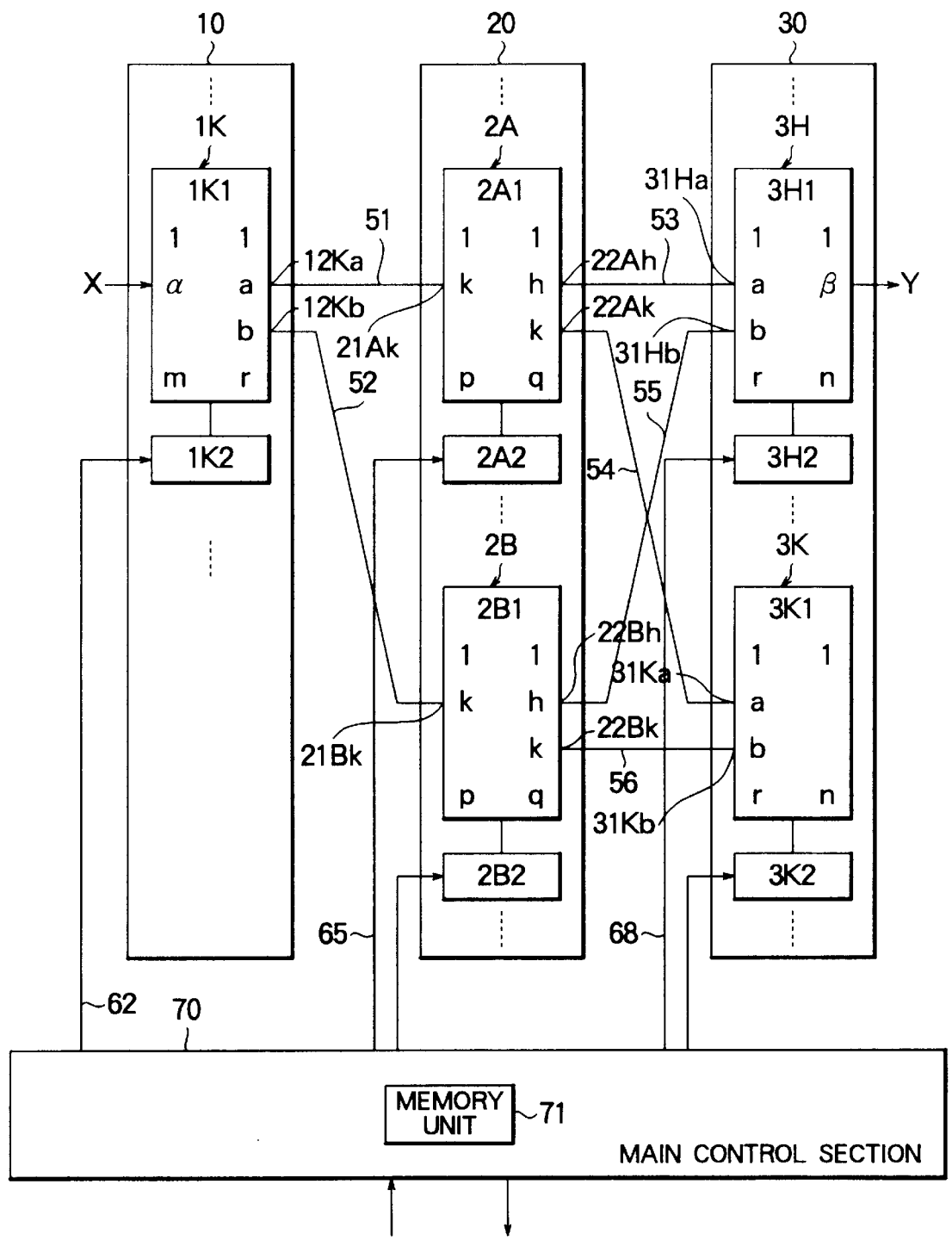
FIG. 9 is a view for use in describing connections between switching groups in two or more stages in the multistage switching network shown in FIG. 7.

Referring to FIGS. 7 through 9, application of the present invention to the three-stage switching network as illustrated in FIGS. 1 through 3 is described. The three-stage switching network has the switching size of K by N defined by ) input lines and N output lines. As described above, the three-stage switching network comprises the switching group 10 in the first stage, the switching group 20 in the second stage, and the switching group 30 in the third stage. The structure of these switching groups is already described in conjunction with FIGS. 1 through 3 and any further description will thus be omitted.

In FIG. 9, it is assumed that a request is issued to connect the input terminal X (where $X \leq M$) to the output terminal Y (where $Y \leq N$).

First, description is made about how to establish a path for the connection. In response to the connection request, the main control section 70 determines that the input terminal X corresponds to the input terminal a of the K-th switching section 1K in the switching group 10 in the first stage. The main control section 70 also determines that the output terminal Y corresponds to the output terminal β of the H-th switching section 3H in the switching group 30 in the third stage. Next, the main control section 70 searches the availability of the output terminal β of the H-th switching section 3H according to the information stored in the memory unit 71. The main control section 70 then carries out one of the following operation depending on the availability of the output terminal β.

(1) When the output terminal β of the H-th switching section 3H is occupied, the main control section 70 looks for an input terminal that is connected to the output terminal β (or Y) of the three-stage switching network. If the input terminal X is found as a result of the seeking, the main control section 70 determines "already connected" because the path that is designated by the connection request is already occupied.

If the input terminal found as a result of the seeking is the one other than the input terminal X, the main control section 70 determines "connection disabled".

(2) When the output terminal β of the H-th switching section 3H is not occupied, the main control section 70 searches, one by one from the first, the availability of the output terminals 1 through r of the K-th switching section 1K in the switching group 10 in the first stage according to the information stored in the memory unit 71.

For example, it is assumed that first through (a−1)-th output terminals 12K1 through 12K(a−1) of the K-th switching section 1K are occupied and the a-th output terminal 12Ka is not occupied. In such a case, the main control section 70 searches the availability of the h-th output terminal 22Ah of the A-th switching section 2A in the switching group 20 in the second stage, that is connected to the H-th switching section 3H in the switching group 30 in the third stage, in which the output terminal β is included. When the output terminal 22Ah is not occupied, the main control section 70 connects the input terminal 11Kα of the K-th switching section 1K in the switching group 10 in the first stage to the output terminal 12Ka. The main control section 70 then connects the input terminal 21Ak of the A-th switching section 2A in the switching group 20 in the second stage to the output terminal 22Ah. Furthermore, the main control section 70 connects the input terminal 31Ha of the H-th switching section 3H in the switching group 30 in the third stage to the output terminal 32Hβ. A path is thus established between the input terminal X and the output terminal Y of the three-stage switching network. The main control section 70 then transmits a command to the switch control units in the individual switching sections for connecting the input terminal and the output terminal obtained in the manner described above. In response to the commands for the connection, each switching section establishes the path that is designated by the request. Each switching section supplies to the main control section 70 a signal indicating "complete" when the input and output terminals are connected to each other without any trouble. Upon reception of the signal indicative of the "normal termination", the main control section 70 stores the information indicative of the connections that is set in the memory unit 71.

When the output terminal 22Ah of the A-th switching section 2A in the switching group 20 in the second stage is occupied, the main control section 70 searches the availability of the b-th output terminal 12Kb of the K-th switching section 1K in the switching group 10 in the first stage. When the output terminal 12Kb is not occupied, the main control section 70 searches the availability of the h-th output terminal 22Bh of the B-th switching section 2B in the switching group 20 in the second stage, that is connected to the B-th switch 3H in the switching group 30 in the third stage. In this manner, the main control section 70 repeats the above-mentioned operations until it finds available output terminals of the switching groups 10 and 20 in the first and the second stages.

The main control section 70 is connected to the individual switch control units in the switching sections via control signal lines. The control signal lines may be disconnected or the switch control unit in the switching sections may be reset. If such disconnection or reset happens, the main control section 70 carries out the following operations. The main control section 70 downloads the information indicative of the connections in the memory unit 71 into the individual switching sections after recovery of the connection. This operation is made in order to match the connection status in the individual switching sections with the connection indicated by the information in the memory unit 71.

The main control section 70 of the present invention reads, for the respective paths, the numbers of the input and output terminals for each switching section that are stored in the memory unit 71 before the transmission of the connection command to the individual switching sections and initiation of the downloading of the information indicative of the connections into the switching memory units. The main control section 70 then checks whether the output terminal having the number read from the memory unit 71 in the switching section of the switching group in one stage can be connected to the input terminal having the number read from the memory unit 71 in the switching section of the switching group in the next adjacent stage. In addition, the main control section 70 also checks ranges of the number of the input and the output terminals.

An example is described where a path is established between the aforementioned input terminal X and the output terminal Y in FIG. 7. The main control section 70 first checks whether the input terminal X and the input terminal α of the X-th switching section 1K satisfy the following equation:

$$X=(K-1) \times m + \alpha.$$

Likewise, the main control section 70 makes sure whether the output terminal Y and the output terminal β of the H-th switching section 3H satisfy the following equation:

$$Y=(H-1) \times n + \beta.$$

The main control section 70 then checks whether the output terminal a of the K-th switching section 1K and the input terminal k of the A-th switching section 2A are within the predetermined ranges ($1 \leq a \leq r$) and ($1 \leq k \leq p$), respectively. Furthermore, the main control section 70 makes sure that the a-th output terminal 12Ka of the K-th switching section 1K is the terminal that is normally connected to the k-th input terminal 21Ak of the A-th switching section 2A via the signal line 51.

The main control section 70 also makes sure that the output terminal h of the A-th switching section 2A and the input terminal a of the H-th switching section 3H are within the ranges of ($1 \leq h \leq q$) and ($1 \leq a \leq r$), respectively. Furthermore, the main control section 70 makes sure that the h-th output terminal 22Ah of the A-th switching section 2A is the terminal that is normally connected to the a-th input terminal 31Ha of the H-th switching section 3H via the signal line 53.

As mentioned above, the main control section 70 checks whether the output terminal having a specific number of the switching section in the switching group in one stage is available for the connection to the input terminal having the other specific number of the switching section in the switching group in the next adjacent stage. The main control section 70 also checks the ranges of the number of the input and the output terminals.

Figure 10:
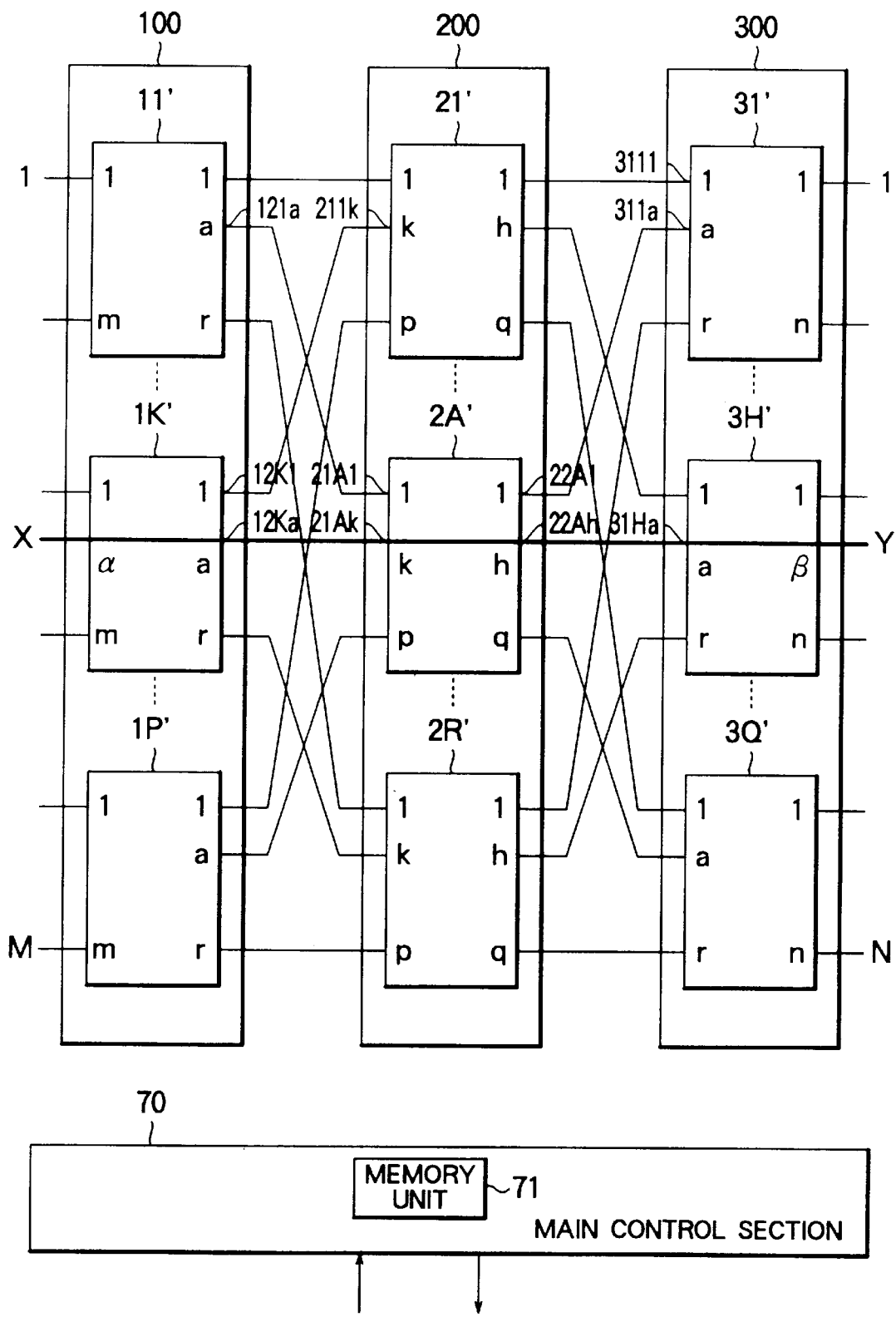
FIG. 10 is a view illustrating a structure of a multistage switching network according to the second embodiment of the present invention.
Figure 12:
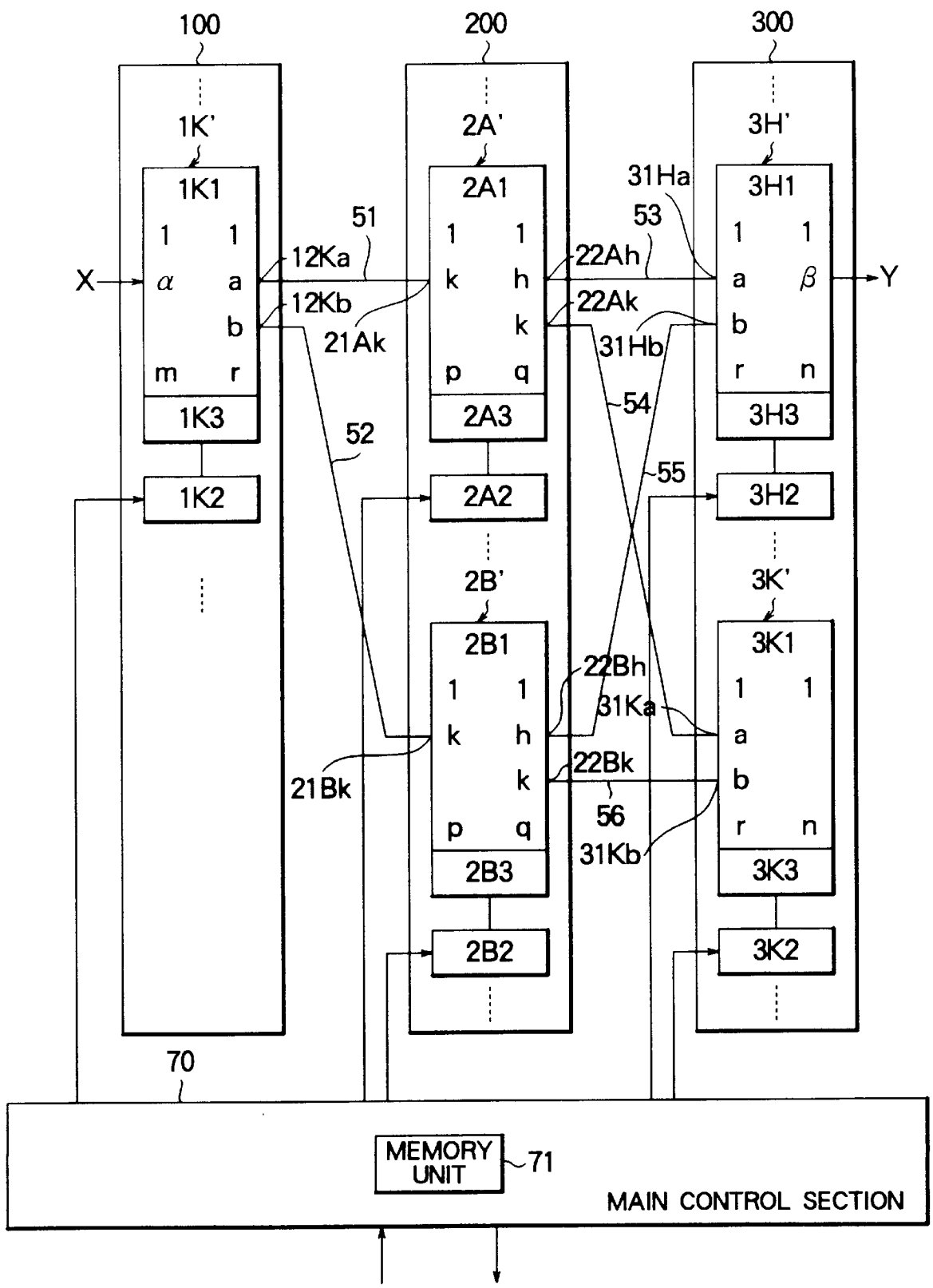
FIG. 12 is a view for use in describing connections between switching groups in two or more stages in the multistage switching network shown in FIG. 10.

Referring to FIGS. 10 through 12, a three-stage switching network according to the second embodiment of the present invention is described. In this embodiment, the three-stage switching network has a switching size of M by N that is defined by M input lines and N output lines.

In FIG. 10, the three-stage switching network comprises a switching group 100 in the first stage, a switching group 200 in the second stage, a switching group 300 in the third stage, and a main control section 70. The switching group 100 in the first stage comprises P switching sections. Each of the P switching sections has a switching size of m by r that is defined by in input lines and r output lines. The switching group 200 in the second stage comprises R switching sections. Each of the R switching sections has a switching size of p by q that is defined by p input lines and q output lines. The switching group 300 in the third stage comprises C switching sections. Each of the Q switching sections has a switching size of r by n that is defined by r input lines and n output lines.

As described later, each switching section comprises a switching unit, a switch memory unit, and a switch control unit. The switching unit is for use in connecting one of a plurality of input terminals and one of a plurality of output terminals. The switch memory unit is for use in storing information indicative of the connections of the switching unit. The switch control section 70 is for controlling the switching unit and the switch memory unit.

In FIG. 11, a K-th switching section 1K' in the switching group 100 in the first stage comprises a switching unit 1K1, a switch control unit 1K2, and a switch memory unit 1K3. An A-th switching section 2A' in the switching group 200 in the second stage comprises a switching unit 2A1, a switch control unit 2A2, and a switch memory unit 2A3. An H-th switching section 3H' in the switching group 300 in the third stage comprises a switching unit 3H1, a switch control unit 3H2, and a switch memory unit 3H3.

The second embodiment is similar to the first embodiment except that each switching section has the switch memory unit. Other components including the control signal lines and the connections therebetween are the same as those described in conjunction with the first embodiment.

Next, operation of the second embodiment is described. In FIG. 12, it is assumed that a request is issued to connect an input terminal X (where $X \leq M$) to an output terminal Y (where $Y \leq N$) of the three-stage switching network.

First, it is described how to establish paths for the connections. In response to the request for connection, the main control section 70 determines that the input terminal X corresponds to an input terminal a of the K-th switching section 1K' in the switching group 100 in the first stage. The main control section 70 also determines that the output terminal Y corresponds to an output terminal β of the B-th switching section 3H' in the switching group 300 in the third stage. Next, the main control section 70 searches the availability of the output terminal β of the H-th switching section 3H' according to the information stored in the memory unit 71. The main control section 70 then carries out one of the following operation depending on the availability of the output terminal β.

(1) When the output terminal β of the H-th switching section 3H' is occupied, the main control section 70 looks for the input terminal that is connected to the output terminal β (or Y) of the three-stage switching network. If the input terminal X is found as a result of the seeking, the main control section 70 determines "already connected" because the path that is designated by the connection request is already occupied. If the input terminal found as a result of the seeking is the one other than the input terminal X, the main control section 70 determines "connection disabled".

(2) When the output terminal β is not occupied, the main control section 70 searches, one by one from the first, the availability of the output terminals 1 through r of the X-th switching section 1K in the switching group 100 in the first stage according to the information stored in the memory unit 71.

For example, it is assumed that first through (a−1)-th output terminals 12K1 through 12K(a−1) of the K-th switching section 1K' are occupied and the a-th output terminal 12Ka is not occupied. In such a case, the main control section 70 searches the availability of the h-th output terminal 22Ah of the A-th switching section 2A' in the switching group 200 in the second stage, that is connected to the H-th switching section 3E' in the switching group 300 in the third stage, in which the output terminal β is included. When the output terminal 22Ah is not occupied, the main control section 70 connects the input terminal 11Kα of the K-th switching section 1K' in the switching group 100 in the first stage to the output terminal 12Ka. The main control section 70 then connects the input terminal 21Ak of the A-th switching section 2A' in the switching group 200 in the second stage to the output terminal 22Ah. Furthermore, the main control section 70 connects the input terminal 31Ha of the H-th switching section 3B' in the switching group 300 in the third stage to the output terminal 32Hβ. A path is thus established between the input terminal X and the output terminal Y of the three-stage switching network. The main control section 70 then transmits a command to the switch control units in the individual switching sections for connecting the input terminal and the output terminal obtained in the manner described above.

When the output terminal 22Ah of the A-th switching section 2A' is occupied, the main control section 70 searches the availability of the b-th output terminal 12Kb of the K-th switching section 1K'. When the output terminal 12Kb is not occupied, the main control section 70 searches the availability of the h-th output terminal 22Bh of the B-th switching section 2B' that is connected to the H-th switch 3H'. In this manner, the main control unit 70 repeats the above-mentioned operations until it finds available output terminals of the switching groups 100 and 200 in the first and the second stages.

The switch control units in the individual switching sections checks whether the connection commands that are transmitted from the main control section 70 are not conflicted with the information that is stored in the switch memory unit and is indicative of the connections. For the S-th switching section 1K' for example, the commands to connect the input terminal 11Kα and the output terminal 12Ka are supplied from the main control section 70. In such a case, the switch control unit 1K2 retrieves the information indicative of the connections that is stored in the switch memory unit 1K3. The switch control unit 1K2 establishes a path according to the connection command when it finds out that the output terminal 12Ka is not occupied. On the other hand, the switch control unit 1K2 produces a signal indicative of "abnormal information" when the output terminal 12Ka is occupied, because the information indicative of the connections that is stored in the memory unit 71 is not match with the one that is stored in the switch memory unit 1K3.

In this second embodiment, the main control section 70 reads, for the respective paths, the numbers of the input and the output terminals for each switching section that are stored in the memory unit 71 before the transmission of the connection command to the individual switching sections and initiation of the downloading of the information indicative of the connections into the switching memory units. The main control section 70 then checks whether the output terminal having a specific number of the switching group in one stage can be connected to the input terminal having the other specific number of the switching group in the nest adjacent stage. In addition, the main control section 70 also checks ranges of the number of the input and the output terminals.

An example is given where a path is established between the aforementioned input terminal X and the output terminal Y in FIG. 10. The main control section 70 first checks whether the input terminal X and the input terminal α of the K-th switching section 1K' satisfy the following equation:

$X=(K-1)\times m+\alpha.$

The main control section 70 also checks whether the output terminal Y and the output terminal β of the H-th switching section 3B' satisfy the following equation:

$Y=(H-1)\times n+\beta.$

The main control section 70 then makes sure that the output terminal a of the K-th switching section 1K' and the input terminal k of the A-th switching section 2A' are within the predetermined ranges (1≦a≦r) and (1≦k≦p), respectively. Furthermore, the main control section 70 makes sure that the a-th output terminal 12Ka of the K-th switching section 1K' is the terminal that is normally connected to the k-th input terminal 21Ak of the A-th switching section 2A' via the signal line 51. The main control section 70 also makes sure that the output terminal h of the A-th switching section 2A' and the input terminal a of the H-th switching section 3H' are within the ranges of (1≦h≦q) and (1≦a≦r), respectively. Furthermore, the main control section 70 makes sure that the h-th output terminal 22Ah of the A-th switching section 2A' is the terminal that is normally connected to the a-th input terminal 31Ha of the H-th switching section 3H' via the signal line 53.

According to the present invention, it is possible to previously make sure that no logical contradiction is present in the information that is stored in the memory unit and is indicative of the connections in the multistage switching network, before the execution of the operation to establish a path for the connections when requested. Therefore, any accidental disconnection can be avoided of the connection path that is already established, which otherwise may occur due to incorrect connection to the output terminal occupied with a portion of the information being damaged in the memory unit when a new path is to be established.

According to the present invention, it is possible to previously make sure that no logical contradiction is present in the information that is stored in the memory unit and is indicative of the connections in the multistage switching network, before initiation of the downloading after the recovery of the connection between the main control section and the switch control units. If the control signal lines are disconnected between the main control section and the switch control units in the individual switching sections or if the switch control unit in the switching sections is reset, the main control section makes the connection status in the individual switching sections match with the connection indicated by the information in the memory unit 71. Therefore, any accidental disconnection can be avoided of the connection path that is already established, which otherwise may occur due to downloading of the information with a portion of the information being damaged in the memory unit when the information that is stored in the memory unit in the main control section and is indicative of the connections is downloaded after the recovery of the connection between the main control section and the switch control units.

What is claimed is:

1. A check system for checking information indicative of connections in a multistage switching network comprising S stages (where S is a natural number) of switching groups and a main control section for controlling the switching groups, the multistage switching network having a switching size of M by N (M×N) that is defined by M input lines and N output lines (where M and N are each a natural number), each of the switching group comprising a plurality of switching sections each having a plurality of input terminals, a plurality of output terminals, a switching unit for use in connecting these terminals with each other, and a switch control unit for controlling the switching unit, the individual switching groups being cross-connected to each other according to a predetermined specification as output terminals 1 through r (where r is a natural number) of a K-th switching section (where K is a natural number) in one switching group are cross-connected to a K-th input terminals of 1 through R switching sections (where R is a natural number) in the switching group in the next adjacent stage, the main control section comprising a memory unit which stores information indicative of connections between the individual switching sections and serving to check, in response to a request for establishing a path to connect the input terminal of the number a to an output terminal of the number b in the multistage switching network (a≦M, b≦N), the availability of the input and the output terminals of each switching section according to the information that is stored in the memory unit and is indicative of the connections, and the main control section searching an available path for a connection in the multistage switching network, sending a command for connection to the switch control units in the individual switching sections according to a result of the seeking, receiving a result of the establishment of the connection path from the switch control units in the individual switching sections, and updating the information that is stored in the memory unit and is indicative of the connections according to the result of the establishment of the connection, wherein:

the main control section comprising first means having a function of checking whether an output terminal having a specific number of a switching group in the C-th stage (C≦(S−1)) can logically be connected to an input terminal having other specific number of a switching group in the (C+1)-th stage, in which the first means makes checking for each connection path in terms of the information that is stored in the memory unit and is indicative of the connections.

2. A check system for checking information indicative of connections in a multistage switching network as claimed in claim 1, wherein the switching unit has a switching size of m by n (where m≦M, n≦N) that is defined by m input lines and n output lines (where m and n are each a natural number), the switch control unit managing the information indicative of the connections in the switch element, receiving the connection command from the main control section via a control line connected to the main control section, and transmitting a signal indicative of the result of the connection, the main control section further comprising second means for use in checking whether numbers of the input terminals of the individual switching sections based on the information that is stored in the memory unit and is indicative of the connections and numbers of switches in the multistage switching network are within a predetermined range.

3. A check system for checking information indicative of connections in a multistage switching network as claimed in claim 2, wherein said second means is provided in the switch control unit rather than the main control section.

* * * * *